US00RE45741E

(19) United States
(12) Reissued Patent
Ogura et al.

(10) Patent Number: US RE45,741 E
(45) Date of Reissued Patent: Oct. 13, 2015

(54) SIGNAL CONVERSION DEVICE

(71) Applicant: Photonics Electronics Technology Research Association (PETRA), Tokyo (JP)

(72) Inventors: Ichiro Ogura, Tokyo (JP); Koichi Takemura, Tokyo (JP)

(73) Assignee: Photonics Electronics Technology Research Association (PETRA), Tokyo (JP)

(21) Appl. No.: 29/474,435

(22) Filed: Sep. 18, 2014

Related U.S. Patent Documents

Reissue of:
(64) Patent No.: Des. 707,193
Issued: Jun. 17, 2014
Appl. No.: 29/467,180
Filed: Sep. 16, 2013

(30) Foreign Application Priority Data

Mar. 18, 2013 (JP) ..... 2013-005943

(51) LOC (10) Cl. ..... 13-03
(52) U.S. Cl.
USPC ..... D13/182
(58) Field of Classification Search
USPC ..... D13/182; D9/432; D21/500; D25/113
CPC ..... G01J 1/44; G01J 1/46; G01J 1/42; G01J 1/10; H03M 1/00; H03M 1/001; H03M 1/02; H03M 1/004; H03M 1/008; H03M 1/005
See application file for complete search history.

(56) References Cited

U.S. PATENT DOCUMENTS

D138,413 S * 8/1944 Powers ..... D9/430
3,497,750 A * 2/1970 Knochel et al. ..... 313/503
D333,615 S * 3/1993 Zutler ..... D3/294
5,565,656 A * 10/1996 Mottahed ..... 174/372
D456,787 S * 5/2002 Wasada et al. ..... D13/182
D461,171 S * 8/2002 Fukumoto et al. ..... D13/182
D465,463 S * 11/2002 Wasada et al. ..... D13/182
D465,773 S * 11/2002 Fukumoto et al. ..... D13/182
D475,028 S * 5/2003 Hori et al. ..... D13/182
D475,355 S * 6/2003 Hori et al. ..... D13/182
D475,982 S * 6/2003 Hori et al. ..... D13/182
6,709,278 B2 * 3/2004 Liu ..... 439/67

(Continued)

OTHER PUBLICATIONS

Notice of Allowance mailed Jan. 17, 2014 in U.S. Appl. No. 29/467,180, 13 pages.

*Primary Examiner* — Phillip S Hyder
(74) *Attorney, Agent, or Firm* — Kilpatrick Townsend & Stockton LLP

(57) CLAIM

The ornamental design for signal conversation device, as shown and described.

DESCRIPTION

FIG. 1 is a front elevation view of a signal conversion device showing our new design;
FIG. 2 is a top plan view thereof;
FIG. 3 is a rear elevation view thereof;
FIG. 4 is a bottom plan view thereof;
FIG. 5 is a left side elevation view thereof;
FIG. 6 is a right side elevation view thereof; and,
FIG. 7 is a top perspective view thereof.
The dashed-dot-dashed lines represent the boundary line of the claimed design. The even spaced broken lines shown in the drawings represent portions of the signal conversion device that form no part of the claimed design.

1 Claim, 4 Drawing Sheets

Figure 1:
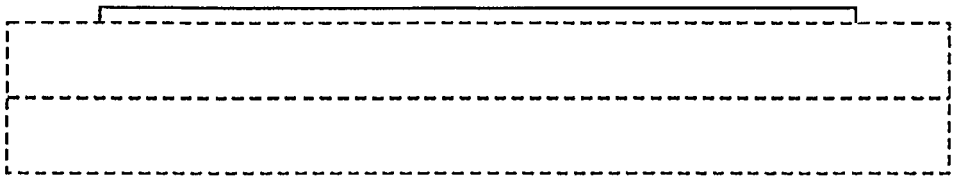
Figure 2:
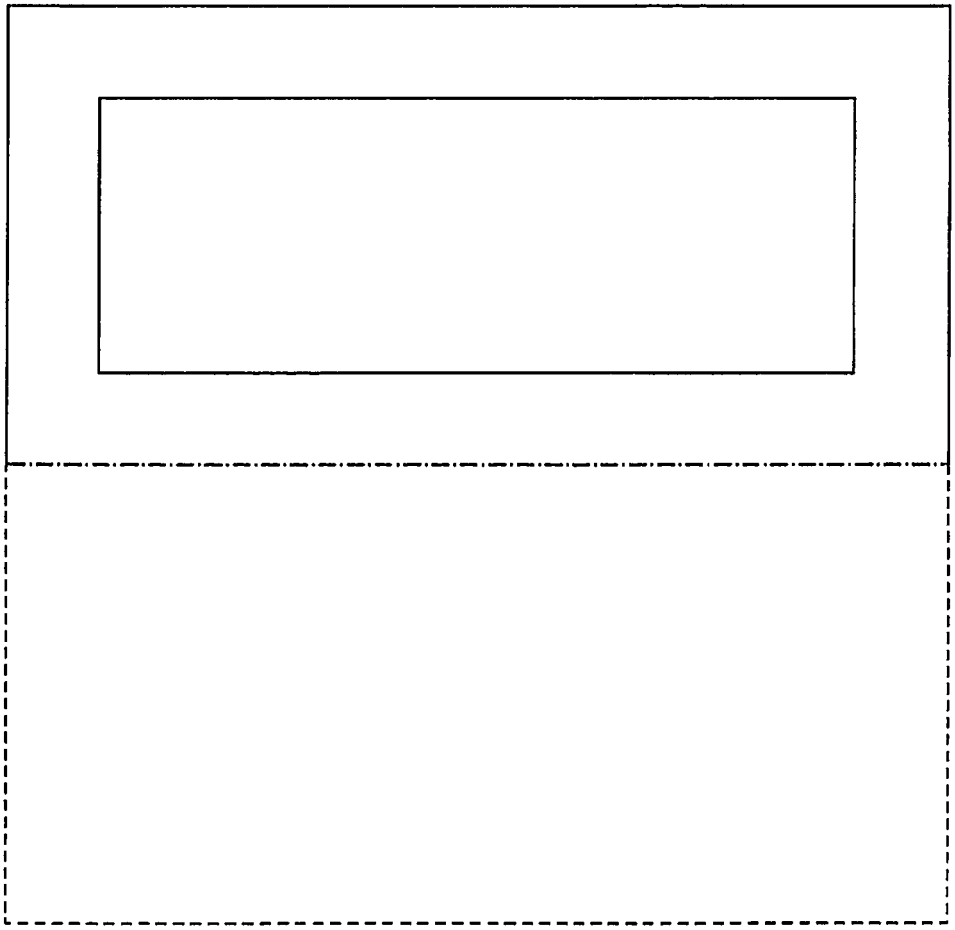
Figure 3:
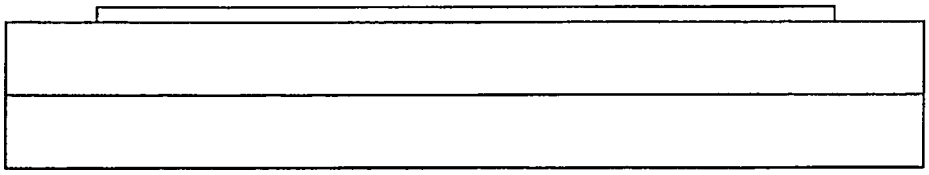
Figure 4:
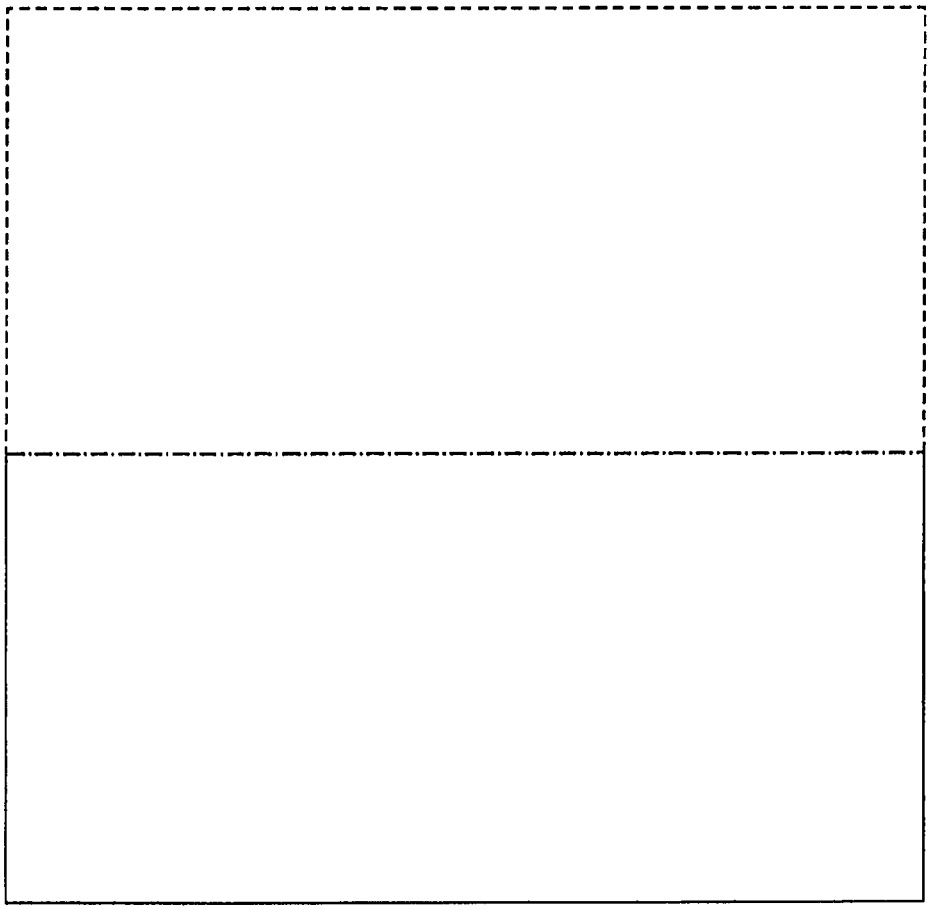
Figure 5:
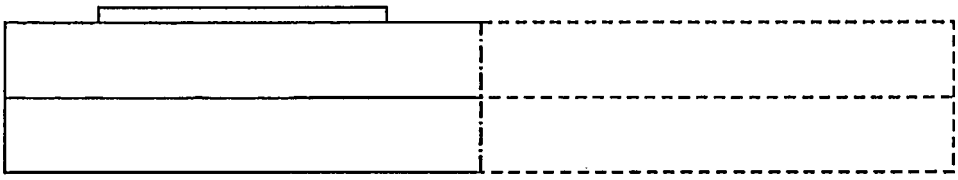
Figure 6:
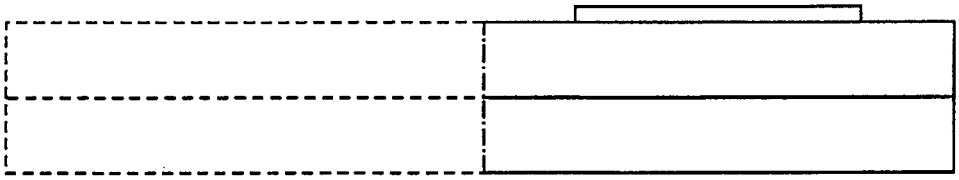
Figure 7:
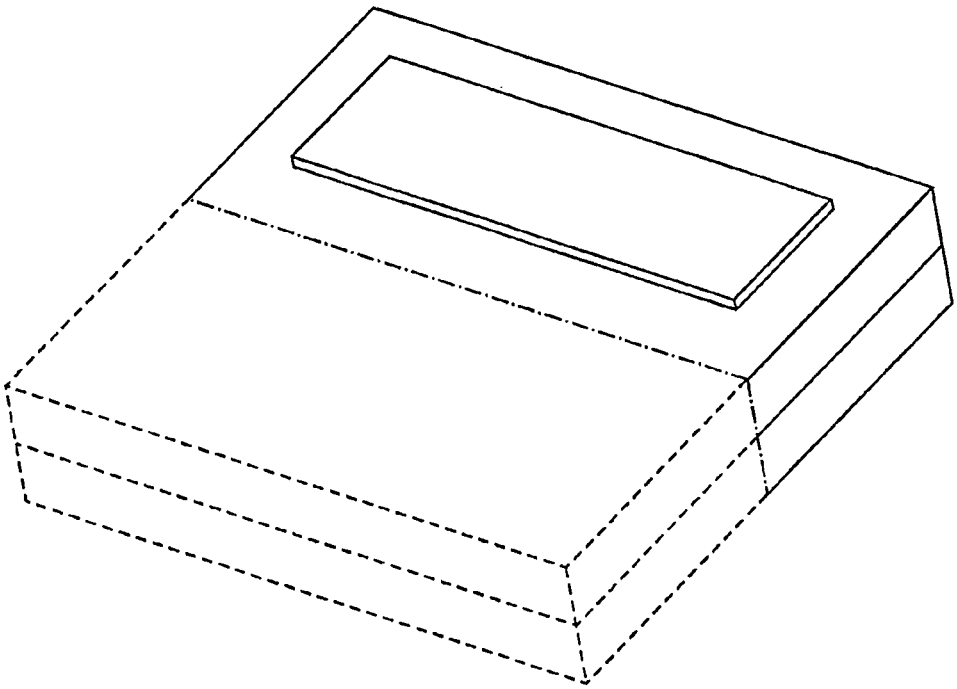

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| 6,823,086 | B1 * | 11/2004 | Dolazza | 382/261 |
| D504,874 | S * | 5/2005 | Celaya et al. | D13/182 |
| D510,728 | S * | 10/2005 | Celaya et al. | D13/182 |
| 7,350,326 | B2 * | 4/2008 | Hu | 40/544 |
| D633,450 | S * | 3/2011 | Fujihara et al. | D13/180 |
| D633,451 | S * | 3/2011 | Fujihara et al. | D13/180 |
| D637,165 | S * | 5/2011 | Kuzuoka | D13/180 |
| D638,380 | S * | 5/2011 | Kuzuoka | D13/180 |
| D642,996 | S * | 8/2011 | Miyake | D13/180 |
| D658,602 | S * | 5/2012 | Egawa et al. | D13/180 |
| D664,506 | S * | 7/2012 | Kuzuoka | D13/180 |
| D664,937 | S * | 8/2012 | Kuzuoka | D13/180 |
| D673,921 | S * | 1/2013 | Ozawa | D13/182 |
| D673,922 | S * | 1/2013 | Moriai et al. | D13/182 |
| D683,634 | S * | 6/2013 | Hayakawa et al. | D10/46 |
| D684,124 | S * | 6/2013 | Matsuhisa et al. | D13/180 |
| D684,125 | S * | 6/2013 | Kawachi et al. | D13/180 |
| D684,126 | S * | 6/2013 | Kawachi et al. | D13/180 |
| D688,637 | S * | 8/2013 | Matsuhisa et al. | D13/180 |
| D690,277 | S * | 9/2013 | Matsuhisa et al. | D13/180 |
| D694,200 | S * | 11/2013 | Matsuhisa et al. | D13/180 |
| 2001/0019245 | A1 * | 9/2001 | Ohshita et al. | 313/506 |
| 2005/0168143 | A1 * | 8/2005 | Kum et al. | 313/512 |
| 2006/0186520 | A1 * | 8/2006 | Toba et al. | 257/678 |
| 2008/0200041 | A1 * | 8/2008 | Lin et al. | 439/62 |
| 2009/0267526 | A1 * | 10/2009 | Sung et al. | 315/169.3 |
| 2011/0248627 | A1 * | 10/2011 | Fukano et al. | 313/504 |

* cited by examiner